UNITED STATES PATENT OFFICE.

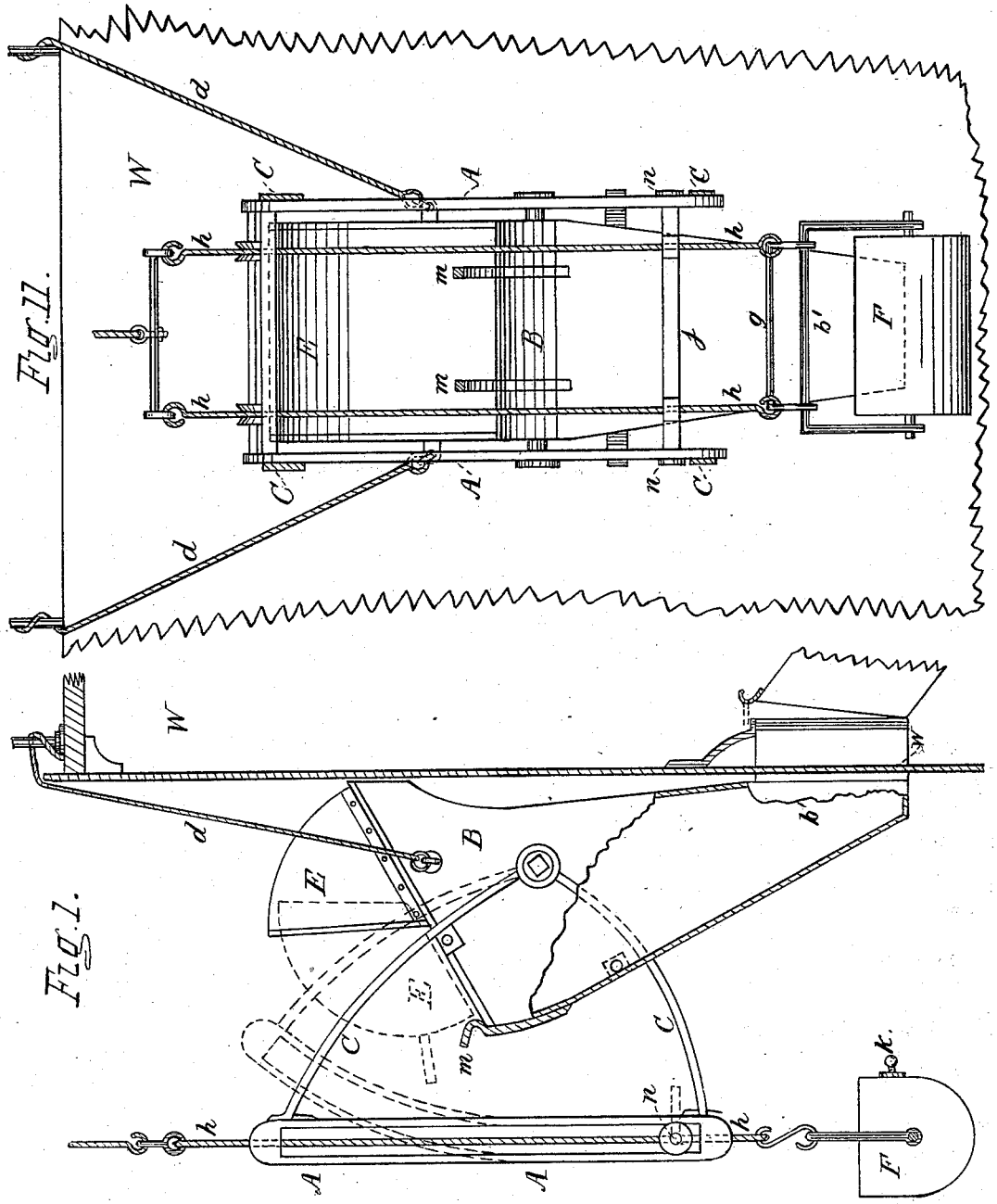

ADOLPHUS RUPERT LARGE, OF BIRKENHEAD, COUNTY OF CHESTER, ENGLAND.

APPARATUS FOR SHIPPING AND TRANSFERRING COAL, SALT, &c.

SPECIFICATION forming part of Letters Patent No. 316,982, dated May 5, 1885.

Application filed June 3, 1884. Renewed January 23, 1885. (No model.) Patented in England January 24, 1884, No. 2,004.

*To all whom it may concern:*

Be it known that I, ADOLPHUS RUPERT LARGE, of Birkenhead, county of Chester, England, have invented a new and useful Improvement in Apparatus for Shipping and Transferring Coal, Salt, Ore, and other Matters; and the following is the specification.

The object of my invention is to produce an apparatus for shipping and transferring coal, salt, ore, grain, and other matters from vessels or other conveyances.

Referring to the drawings, Figure I is a partial sectional elevation of my invention. Fig. II is a front elevation of same.

A A are two guide-bars supported or pivoted to the chute or filler B by bracket-frames C C. The chute is suspended alongside the vessel W by chains $d\,d$. The small or outlet end $b'$ of the chute is placed through the hole in the vessel into which the grain is to be entered.

The mouth of the chute is provided with a cover, E, and automatic cover E', (shown in dotted lines,) opened by the bucket F, and closed by its own gravity.

F is the bucket, balanced on the arms $g\,g$. The bucket is lowered and raised by the chains $h\,h$. Now, when the bucket is raised the arm $g$ will come in contact with the cross-piece $j$, which slides up and down the slot in the guide-rod A A. This will guide the bucket in its upward movement. As the bucket rises the projection K on the bucket comes in contact with the hook $m$ on the sheet B, and is caused to tip and automatically dump the load into the chute. By this arrangement the buckets can be automatically dumped without the assistance of an extra person to do the same work.

The guide-arms A A can be curved, as shown in dotted lines, Fig. I; but straight is preferable, as shown.

There may be two or more hooks on the chute, for catching the bucket.

The cross-arm is provided with friction-rollers $n\,n$, the object of which is to enable the arm to move freely.

The parts may be made of wood or iron.

Having thus described my invention, I claim—

1. The arms A A, in combination with the bracket C and chute B, substantially as and for the purpose set forth.

2. The chute B, in combination with the bucket F, substantially as and for the purpose set forth.

3. The bucket F, in combination with the frame A A, chain D D, and chute B, substantially as and for the purpose set forth.

In testimony that I claim the foregoing as my invention I have signed my name, in presence of two witnesses, this 28th day of March, 1884.

ADOLPHUS RUPERT LARGE.

Witnesses:
   ROBERT JACKSON,
   JAMES A. LANCASTER.